(12) United States Patent
Li (10) Patent No.: US 12,132,307 B2
(45) Date of Patent: Oct. 29, 2024

(54) CURRENT LIMITING CIRCUITS CAPABLE OF ADJUSTING CURRENT LIMITING VALUE

(71) Applicant: TCL China Star Optoelectronics Technology Co., Ltd., Shenzhen (CN)

(72) Inventor: Haoran Li, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/603,073

(22) PCT Filed: Jul. 29, 2021

(86) PCT No.: PCT/CN2021/109098
§ 371 (c)(1),
(2) Date: Oct. 12, 2021

(87) PCT Pub. No.: WO2023/000367
PCT Pub. Date: Jan. 26, 2023

(65) Prior Publication Data
US 2024/0170955 A1    May 23, 2024

(30) Foreign Application Priority Data
Jul. 20, 2021  (CN) .......................... 202110816694.6

(51) Int. Cl.
*H02H 9/02*  (2006.01)
*H02H 7/20*  (2006.01)

(52) U.S. Cl.
CPC ............ *H02H 9/025* (2013.01); *H02H 7/205* (2013.01)

(58) Field of Classification Search
CPC .............................. H02H 9/025; H02H 7/205
See application file for complete search history.

(56) References Cited

U.S. PATENT DOCUMENTS

2010/0019807 A1    1/2010  Zhang et al.

FOREIGN PATENT DOCUMENTS

| CN | 101291103 A |   | 10/2008 |
| CN | 101420178 A | * | 4/2009 |
| CN | 101551688 A |   | 10/2009 |

(Continued)

OTHER PUBLICATIONS

Japanese Office Action issued in corresponding Japanese Patent Application No. 特願2021-549396 dated Sep. 19, 2023, pp. 1-5.

(Continued)

*Primary Examiner* — Sisay G Tiku
(74) *Attorney, Agent, or Firm* — Nathan & Associates; Menachem Nathan (57) ABSTRACT

A current limiting circuit includes a first voltage terminal, a second voltage terminal, a first transistor and a current limiting module. The first transistor includes an input terminal and an output terminal of the first transistor that are connected in series on a path formed by the first voltage terminal and the second voltage terminal. The current limiting module is electrically connected to a control terminal of the first transistor. The current limiting module is configured to output a control signal to the control terminal of the first transistor for controlling a state of the first transistor so that a current limiting value of the current limiting circuit is adjustable.

19 Claims, 3 Drawing Sheets

(56) References Cited

FOREIGN PATENT DOCUMENTS

| CN | 102654828 | A | | 9/2012 | | |
| CN | 102832818 | A | | 12/2012 | | |
| CN | 103516256 | A | | 1/2014 | | |
| CN | 103606884 | A | | 2/2014 | | |
| CN | 103701312 | A | | 4/2014 | | |
| CN | 104539145 | A | | 4/2015 | | |
| CN | 104682683 | A | | 6/2015 | | |
| CN | 105471049 | A | | 4/2016 | | |
| CN | 106786395 | A | | 5/2017 | | |
| CN | 107196521 | A | * | 9/2017 | | |
| CN | 108648678 | A | | 10/2018 | | |
| CN | 108767810 | A | | 11/2018 | | |
| CN | 109302171 | A | | 2/2019 | | |
| CN | 109753100 | A | | 5/2019 | | |
| CN | 209233727 | U | | 8/2019 | | |
| CN | 209545214 | U | | 10/2019 | | |
| CN | 111064159 | A | * | 4/2020 | | |
| CN | 212935542 | U | | 4/2021 | | |
| CN | 113009956 | A | | 6/2021 | | |
| CN | 113612209 | A | * | 11/2021 | ............... | H02H 9/02 |
| CN | 115616276 | A | * | 1/2023 | | |
| JP | 2003203982 | A | | 7/2003 | | |
| JP | 2005157743 | A | | 6/2005 | | |
| JP | 2006115616 | A | | 4/2006 | | |
| JP | 2007133730 | A | | 5/2007 | | |
| JP | 2011030391 | A | | 2/2011 | | |
| JP | 2012160928 | A | | 8/2012 | | |
| JP | 2015154524 | A | | 8/2015 | | |
| JP | 6814202 | B2 | | 1/2021 | | |
| KR | 20230173465 | A | * | 12/2023 | | |

OTHER PUBLICATIONS

International Search Report in International application No. PCT/CN2021/109098, mailed on Mar. 29, 2022.
Written Opinion of the International Search Authority in International application No. PCT/CN2021/109098, mailed on Mar. 29, 2022.
Chinese Office Action issued in corresponding Chinese Patent Application No. 202110816694.6 dated Mar. 2, 2022, pp. 1-12.
Korean Office Action issued in corresponding Korean Patent Application No. 10-2021-7027624 dated Apr. 28, 2023, pp. 1-4.

* cited by examiner

CURRENT LIMITING CIRCUITS CAPABLE OF ADJUSTING CURRENT LIMITING VALUE

FIELD OF THE DISCLOSURE

The present disclosure relates to a field of display technology, and more particularly, to a current limiting circuit.

BACKGROUND

In the display panel industry, traditional power management integrated chips will perform a current limiting operation during the start-up of an AVDD voltage. The purpose of the current limiting operation is to slowly turn on isolation transistors and smoothly establish the AVDD voltage to prevent excessive currents from damaging other electronic components in the loop.

However, the disadvantage of the conventional design is that the current limiting value for the AVDD voltage is constant. If the current limiting value is excessively small, the power management integrated chip cannot establish the voltage within the specified time during booting-up under a heavy-load due to the current limiting, and, thus, the booting-up fails; if the current limiting value is excessively large, the components of the power management integrated chip are damaged by the long-term high current when the back-end load is short-circuited, for example, the source driver is damaged and on fire.

SUMMARY

Technical Problem

Thus, the present disclosure provides a current limiting circuit which can make a current limiting value of the current limiting circuit adjustable, thereby preventing the power management integrated chip from causing the failed booted-up under a heavy load and further preventing the power management integrated chip from being damaged due to a short-circuited back-end load during the booting-up.

Technical Solution

In a first aspect, an embodiment of the present disclosure is to provide current limiting circuit. The current limiting circuit includes a first voltage terminal, a second voltage terminal, a first transistor and a current limiting module. The first transistor includes an input terminal and an output terminal of the first transistor that are connected in series on a path formed by the first voltage terminal and the second voltage terminal. The current limiting module is electrically connected to a control terminal of the first transistor. The current limiting module is configured to output a control signal to the control terminal of the first transistor for controlling a state of the first transistor so that a current limiting value of the current limiting circuit is adjustable.

Optionally, the current limiting module comprises a boost unit, a variable voltage unit, a first comparison unit, and a constant current unit. A first terminal of the boost unit is electrically connected to the first voltage terminal. A second terminal of the boost unit is electrically connected to the input terminal of the first transistor. A first terminal of the variable voltage unit is electrically connected to the first voltage terminal. A second terminal of the variable voltage unit is electrically connected to a first terminal of the first comparison unit. A second terminal of the first comparison unit is electrically connected to the input terminal of the first transistor. A third terminal of the first comparison unit is electrically connected to a first terminal of the constant current unit. A second terminal of the constant current unit is electrically connected to the control terminal of the first transistor. The boost unit is configured to cause a voltage at the second terminal of the boost unit to be higher than a voltage at the first terminal of the boost unit. The variable voltage unit is configured to output a variable voltage. The first comparison unit is configured to output a constant-current-unit control signal at the third terminal of the first comparison unit based on a voltage at the first terminal of the first comparison unit and a voltage at the second terminal of the first comparison unit, and the constant current unit is controlled by the constant-current-unit control signal to output a constant current.

Optionally, the boost unit comprises an inductor, a second transistor, and a diode. A first terminal of the inductor is electrically connected to the first voltage terminal, a second terminal of the inductor and a first terminal of the second transistor are electrically connected to a first terminal of the diode, a second terminal of the diode is electrically connected to the input terminal of the first transistor, and a second terminal of the second transistor is electrically connected to a ground terminal.

Optionally, the current limiting value of the current limiting circuit is obtained according to a formula: $I=(V1-V2)/R$, where I represents the current limiting value of the current limiting circuit, V1 represents a voltage value set by the variable voltage unit, V2 represents a voltage drop value of the diode, and R represents an impedance value of the inductor.

Optionally, the variable voltage unit comprises a variable voltage source. A first terminal of the variable voltage source is electrically connected to the first voltage terminal, and a second terminal of the variable voltage source is electrically connected to the first terminal of the first comparison unit.

Optionally, the first comparison unit comprises a first comparator. A first terminal of the first comparator is electrically connected to the second terminal of the variable voltage unit, a second terminal of the first comparator is electrically connected to the input terminal of the first transistor, and a third terminal of the first comparator is electrically connected to the first terminal of the constant current unit.

Optionally, the constant current unit comprises a constant current source. A first terminal of the constant current source is electrically connected to the third terminal of the first comparison unit, a second terminal of the constant current source is electrically connected to the control terminal of the first transistor, and a third terminal of the constant current source is electrically connected to a ground terminal.

Optionally, the current limiting circuit further comprises a timing unit and a second comparison unit. The timing unit is electrically connected to a first terminal of the second comparison unit. A second terminal of the second comparison unit is electrically connected to the second voltage terminal. A third terminal of the second comparison unit receives a constant voltage signal, and a fourth terminal of the second comparison unit is electrically connected to the control terminal of the first transistor. The timing unit is configured to output a comparison-unit control signal at intervals with a preset time. The second comparison unit is controlled by the comparison-unit control signal to output a first-transistor control signal of the first transistor at the fourth terminal of the second comparison unit to the control terminal of the first transistor based on a voltage at the second terminal of the second comparison unit and a voltage at the third terminal of the second comparison unit.

Optionally, the timing unit comprises a timer electrically connected to the first terminal of the second comparison unit.

Optionally, the second comparison unit comprises a second comparator. A first terminal of the second comparator is electrically connected to the timing unit, a second terminal of the second comparator is electrically connected to the second voltage terminal, a third terminal of the second comparator receives the constant voltage signal, and a fourth terminal of the second comparator is electrically connected to the control terminal of the first transistor.

Optionally, a voltage value of the constant voltage signal is in a range between 0.85 times a voltage value of the first voltage terminal and 0.9 times the voltage value of the first voltage terminal.

Optionally, the current limiting circuit further comprises a first capacitor, a second capacitor, a third capacitor, and a resistor. A first terminal of the first capacitor is electrically connected to the first voltage terminal, a first terminal of the second capacitor is electrically connected to the input terminal of the first transistor, a first terminal of the third capacitor and a first terminal of the resistor are electrically connected to the second voltage terminal, and a second terminal of the first capacitor, a second terminal of the second capacitor, a second terminal of the third capacitor, and a second terminal of the resistor are electrically connected to a ground terminal.

In a second aspect, an embodiment of the present disclosure is to provide current limiting circuit. The current limiting circuit includes a first voltage terminal, a second voltage terminal, a first transistor and a current limiting module. The first transistor includes an input terminal and an output terminal of the first transistor that are connected in series on a path formed by the first voltage terminal and the second voltage terminal. The current limiting module is electrically connected to a control terminal of the first transistor. The current limiting module is configured to output a control signal to the control terminal of the first transistor for controlling a state of the first transistor so that a current limiting value of the current limiting circuit is adjustable. The current limiting module comprises a boost unit, a variable voltage unit, a first comparison unit, and a constant current unit. A first terminal of the boost unit is electrically connected to the first voltage terminal. A second terminal of the boost unit is electrically connected to the input terminal of the first transistor. A first terminal of the variable voltage unit is electrically connected to the first voltage terminal. A second terminal of the variable voltage unit is electrically connected to a first terminal of the first comparison unit. A second terminal of the first comparison unit is electrically connected to the input terminal of the first transistor. A third terminal of the first comparison unit is electrically connected to a first terminal of the constant current unit. A second terminal of the constant current unit is electrically connected to the control terminal of the first transistor. The boost unit is configured to cause a voltage at the second terminal of the boost unit to be higher than a voltage at the first terminal of the boost unit. The variable voltage unit is configured to output a variable voltage. The first comparison unit is configured to output a constant-current-unit control signal at the third terminal of the first comparison unit based on a voltage at the first terminal of the first comparison unit and a voltage at the second terminal of the first comparison unit, and the constant current unit is controlled by the constant-current-unit control signal to output a constant current. The current limiting circuit further comprises a first capacitor, a second capacitor, a third capacitor, and a resistor. A first terminal of the first capacitor is electrically connected to the first voltage terminal, a first terminal of the second capacitor is electrically connected to the input terminal of the first transistor, a first terminal of the third capacitor and a first terminal of the resistor are electrically connected to the second voltage terminal, and a second terminal of the first capacitor, a second terminal of the second capacitor, a second terminal of the third capacitor, and a second terminal of the resistor are electrically connected to a ground terminal.

Optionally, the boost unit comprises an inductor L, a second transistor Q, and a diode. A first terminal of the inductor is electrically connected to the first voltage terminal, a second terminal of the inductor and a first terminal of the second transistor are electrically connected to a first terminal of the diode, a second terminal of the diode is electrically connected to the input terminal of the first transistor, and a second terminal of the second transistor is electrically connected to a ground terminal.

Optionally, the current limiting value of the current limiting circuit is obtained according to a formula: $I=(V1-V2)/R$, where I represents the current limiting value of the current limiting circuit, V1 represents a voltage value set by the variable voltage unit, V2 represents a voltage drop value of the diode, and R represents an impedance value of the inductor.

Optionally, the variable voltage unit comprises a variable voltage source. A first terminal of the variable voltage source is electrically connected to the first voltage terminal, and a second terminal of the variable voltage source is electrically connected to the first terminal of the first comparison unit.

Optionally, the first comparison unit comprises a first comparator. A first terminal of the first comparator is electrically connected to the second terminal of the variable voltage unit, a second terminal of the first comparator is electrically connected to the input terminal of the first transistor, and a third terminal of the first comparator is electrically connected to the first terminal of the constant current unit.

Optionally, the constant current unit comprises a constant current source. A first terminal of the constant current source is electrically connected to the third terminal of the first comparison unit, a second terminal of the constant current source is electrically connected to the control terminal of the first transistor, and a third terminal of the constant current source is electrically connected to a ground terminal.

Optionally, the current limiting circuit further comprises a timing unit and a second comparison unit. The timing unit is electrically connected to a first terminal of the second comparison unit. A second terminal of the second comparison unit is electrically connected to the second voltage terminal. A third terminal of the second comparison unit receives a constant voltage signal, and a fourth terminal of the second comparison unit is electrically connected to the control terminal of the first transistor. The timing unit is configured to output a comparison-unit control signal at intervals with a preset time. The second comparison unit is controlled by the comparison-unit control signal to output a first-transistor control signal of the first transistor at the fourth terminal of the second comparison unit to the control terminal of the first transistor based on a voltage at the second terminal of the second comparison unit and a voltage at the third terminal of the second comparison unit.

Optionally, the timing unit comprises a timer electrically connected to the first terminal of the second comparison unit. The second comparison unit comprises a second comparator. A first terminal of the second comparator is electrically connected to the timing unit, a second terminal of the second comparator is electrically connected to the second voltage terminal, a third terminal of the second comparator receives the constant voltage signal, and a fourth terminal of the second comparator is electrically connected to the control terminal of the first transistor.

Advantageous Effect

The current limiting circuit of the embodiment of the present disclosure controls the state of the first transistor through outputting a control signal by the current limiting module to the control terminal of the first transistor so that the current limiting value of the current limiting circuit are adjustable, thereby preventing the power management integrated chip from causing the failed booted-up under a heavy load and further preventing the power management integrated chip from being damaged due to a short-circuited back-end load during the booting-up.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

The current limiting circuit of the embodiment of the present disclosure controls the state of the first transistor through outputting a control signal by the current limiting module to the control terminal of the first transistor so that the current limiting value of the current limiting circuit are adjustable, thereby preventing the power management integrated chip from causing the failed booted-up under a heavy load and further preventing the power management integrated chip from being damaged due to a short-circuited back-end load during the booting-up.

The transistors used in the embodiments of the present disclosure may include P-type transistors and/or N-type transistors. When the gate of the P-type transistor is applied with low level voltage, the source and drain are conducted. When the gate is applied with high level voltage, the source and the drain are not conducted. When the gate of the N-type transistor is applied with high level voltage, the source and drain are conducted. When the gate of the N-type transistor is applied with low level voltage, the source and the drain are not conducted.

Figure 1:
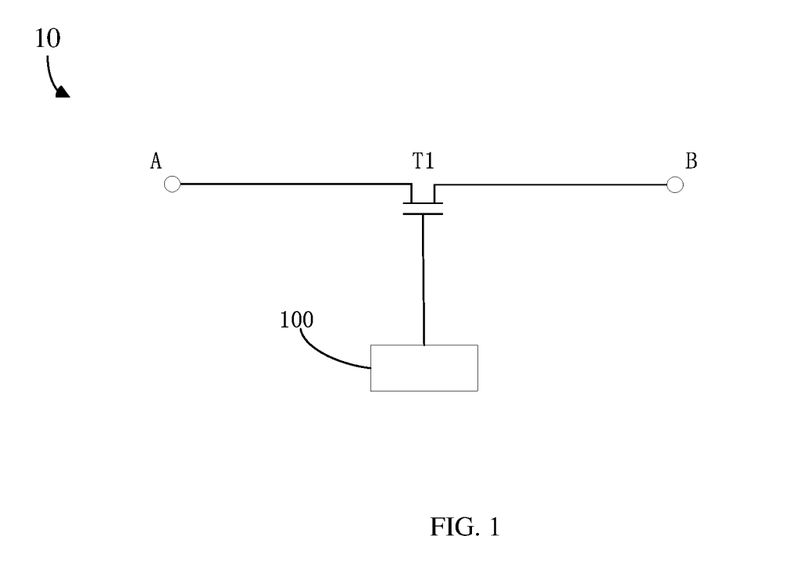
FIG. 1 is a structural schematic diagram of a current limiting circuit according to an exemplary embodiment of the present disclosure.

Please refer to FIG. 1. FIG. 1 is a structural schematic diagram of a current limiting circuit according to an exemplary embodiment of the present disclosure. The current limiting circuit 10 comprises a first voltage terminal A, a second voltage terminal B, a first transistor T1, and a current limiting module 100. The input terminal of the first transistor T1 and the output terminal of the first transistor T1 are connected in series on the path formed by the first voltage terminal A and the second voltage terminal B. The current limiting module 100 is electrically connected to the control terminal of the first transistor T1. The current limiting module 100 is configured to output a control signal to the control terminal of the first transistor T1 for controlling the state of the first transistor T1 so that the current limiting value of the current limiting circuit 10 is adjustable. The first terminal of the first transistor T1 is one of the source and the drain of the transistor, and the second terminal of the first transistor T1 is the other of the source and the drain of the transistor. The control terminal is the gate of the transistor.

The first voltage terminal A may serve as an operation voltage input terminal of a power management integrated chip, and the second voltage terminal B may serve as an AVDD voltage output terminal. In the display panel industry, the power management integrated chip will perform a current limiting operation during the start-up of the AVDD voltage. The purpose is to slowly turn on the first transistor T1 and smoothly establish up the AVDD voltage, thereby preventing excessive currents from damaging other electronic components in the loop.

If the current limiting value of the current limiting circuit 10 is excessively small, the power management integrated chip cannot establish the voltage within the specified time during booting-up under a heavy-load due to the current limiting, and, thus, the booting-up fails; if the current limiting value of the current limiting circuit 10 is excessively large, the components of the power management integrated chip are damaged by the long-term high current when the back-end load is short-circuited. In the embodiment of the present disclosure, the current limiting value of the current limiting circuit 10 is adjustable. That is, the current limiting circuit 10 of the embodiment of the present disclosure is capable of setting the current limiting value of the current limiting circuit 10 according to the actual situation, so that the current limiting value of the current limiting circuit 10 is adjusted, which prevents the power management integrated chip from causing the failed booted-up under a heavy load and further prevents the power management integrated chip from being damaged due to a short-circuited back-end load during the booting-up.

Figure 2:
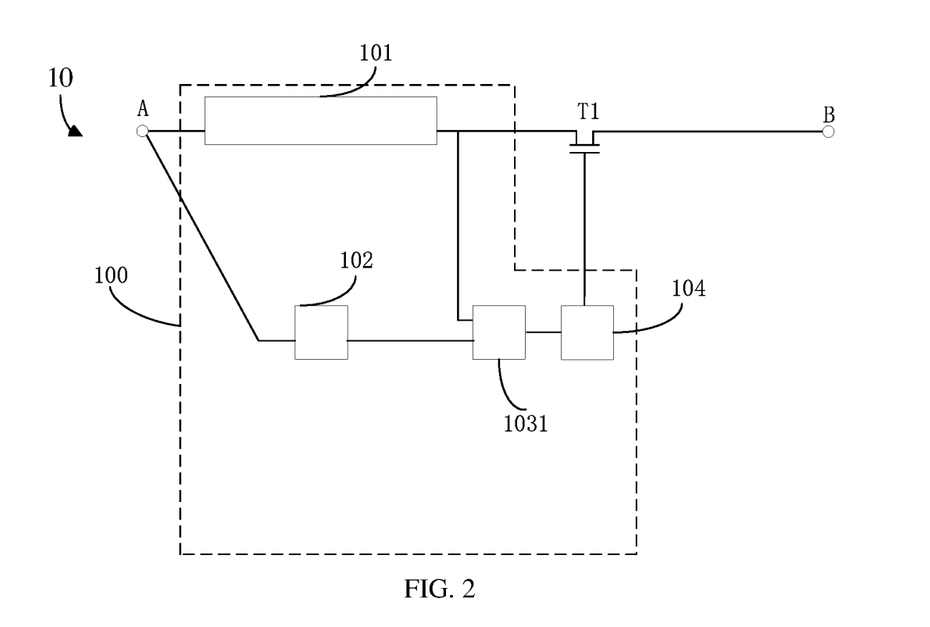
FIG. 2 is a structural schematic diagram of a current limiting circuit according to another exemplary embodiment of the present disclosure.

Please refer to FIG. 2. FIG. 2 is a structural schematic diagram of a current limiting circuit according to another exemplary embodiment of the present disclosure. The current limiting module 100 comprises a boost unit 101, a variable voltage unit 102, a first comparison unit 1031, and a constant current unit 104. The first terminal of the boost unit 101 is electrically connected to the first voltage terminal A. The second terminal of the boost unit 101 is electrically connected to the input terminal of the first transistor T1. The first terminal of the variable voltage unit 102 is electrically connected to the first voltage terminal A. The second terminal of the variable voltage unit 102 is electrically connected to the first terminal of the first comparison unit 1031. The second terminal of the first comparison unit 1031 is electrically connected to the input terminal of the first transistor T1. The second terminal of the constant current unit 104 is electrically connected to the control terminal of the first transistor T1. It can be understood that, in the embodiment of the present disclosure, the current limiting value of the current limiting circuit 10 is adjustable through the operations of the boost unit 101, the variable voltage unit 102, the first comparison unit 1031, and the constant current unit 104.

Figure 3:
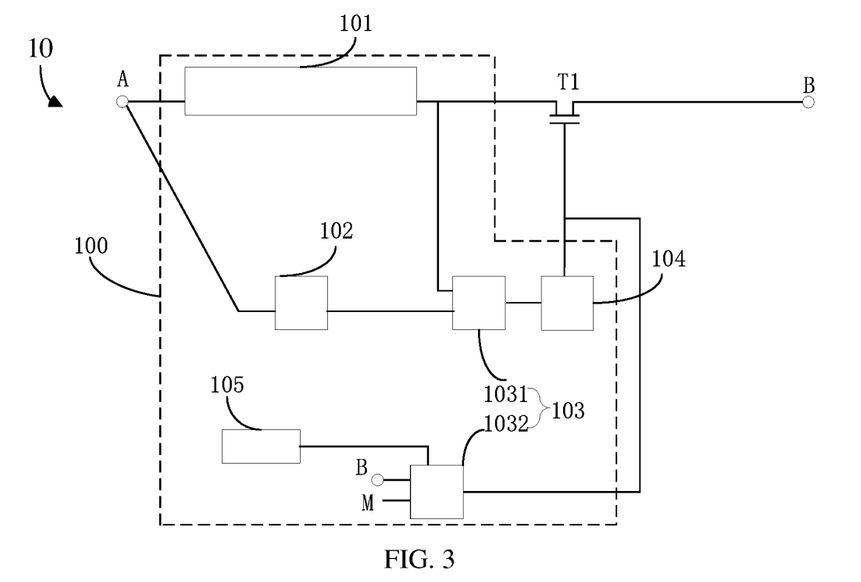
FIG. 3 is a structural schematic diagram of a current limiting circuit according to another exemplary embodiment of the present disclosure.

Please refer to FIG. 3. FIG. 3 is a structural schematic diagram of a current limiting circuit according to another exemplary embodiment of the present disclosure. The current limiting circuit 10 shown in FIG. 3 further comprises a second comparison unit 1032 and a timing unit 105.

The current limiting module 100 comprises a boost unit 101, a variable voltage unit 102, a comparison unit 103, a constant current unit 104, and a timing unit 105. The comparison unit 103 comprises a first comparison unit 1031 and a second comparison unit 1032. The first terminal of the boost unit 101 is electrically connected to the first voltage terminal A. The second terminal of the boost unit 101 is electrically connected to the input terminal of the first transistor T1. The first terminal of the variable voltage unit 102 is electrically connected to the first voltage terminal A. The second terminal of the variable voltage unit 102 is electrically connected to the first terminal of the first comparison unit 1031. The second terminal of the first comparison unit 1031 is electrically connected to the input terminal of the first transistor T1. The third terminal of the first comparison unit 1031 is electrically connected to the first terminal of the constant current unit 104. The second terminal of the constant current unit 104 is electrically connected to the control terminal of the first transistor T1. The first timing unit 105 is electrically connected to the first terminal of the second comparison unit 1032. The second terminal of the second comparison unit 1032 is electrically connected to the second voltage terminal B. The third terminal of the second comparison unit 1032 receives a constant voltage signal M. The fourth terminal of the second comparison unit 1032 is electrically connected to the control terminal of the first transistor T1. In the embodiment of the present disclosure, the current limiting value and the current limiting time of the current limiting circuit 10 are adjustable through the operations of the boost unit 101, the variable voltage unit 102, the first comparison unit 1031, the second comparison unit 1032, the constant current unit 104, and the timing unit 105.

The boost unit 101 controls an inductor L to store and release energy through turned-on and turned-off states of a second transistor Q, so that the output voltage of the boost unit 101 is higher than the input voltage thereof. That is, the boost unit 101 operates to make the voltage of the second terminal of the boost unit 101 greater than the voltage of the first terminal of the boosting unit 101. The first terminal of the boost unit 101 serves as an input terminal for inputting a voltage, and the second terminal of the boost unit 101 serves as an output terminal for outputting a voltage.

The variable voltage unit 102 can always keep the voltage across the two terminals thereof constant regardless of the amount of the current flowing through it. The variable voltage unit 102 has two basic properties: first, the terminal voltages of the variable voltage unit 102 are independent of the current flowing it; second, the voltage of the variable voltage unit 102 is determined, while the current flowing through it is arbitrary. That is, the variable voltage unit 102 operates to output a variable voltage.

The comparison unit 103 comprises the first comparison unit 1031 and the second comparison unit 1032. The function of the comparison unit 103 is to compare the two voltages (to indicate the relationship between the two input voltages using a high or low level of the output voltage). When the voltage at the "positive (+)" input terminal is higher than the voltage at the "negative (−)" input terminal, the output voltage of the voltage comparator is at a high level; when the voltage at the "positive (+)" input terminal is lower than the voltage at the "negative (−)" input terminal, the output voltage of the voltage comparator is at a low level.

The first comparison unit 1031 is configured to output a control signal of the constant current unit 104 at the third terminal of the first comparison unit 1031 based on the voltage at the first terminal of the first comparison unit 1031 and the voltage at the second terminal of the first comparison unit 1031. The second comparison unit 1032 is controlled by the comparison-unit control signal to output the control signal of the first transistor T1 at the fourth terminal of the second comparison unit 1032 to the control terminal of the first transistor T1 based on the voltage at the second terminal of the second comparison unit 1032 and the voltage at the third terminal of the second comparison unit 1032.

The first terminal of the first comparison unit 1031 is a "negative (−)" input terminal, the second terminal of the first comparison unit 1031 is a "positive (+)" input terminal, and the third terminal of the first comparison unit 1031 is an output terminal. When the voltage at the first terminal of the first comparison unit 1031 is higher than the voltage at the second terminal of the first comparison unit 1031, the constant-current-unit control signal output by the third terminal of the first comparison unit 1031 is at a low voltage level; when the voltage at the first terminal of the first comparison unit 1031 is lower than the voltage at the second terminal of the first comparing unit 1031, the constant-current-unit control signal output by the third terminal of the first comparing unit 1031 is at a high voltage level. The first terminal of the second comparison unit 1032 is an enable terminal, the second terminal of the second comparison unit 1032 is a "positive (+)" input terminal, the third terminal of the second comparison unit 1032 is a "negative (−)" input terminal, and the fourth terminal of the second comparison unit 1032 is an output terminal. When the first terminal of the second comparison unit 1032 is at a high voltage level, the second comparison unit 1032 starts to operate; when the first terminal of the second comparison unit 1032 is at a low voltage level, the second comparison unit 1032 stops operating. When the voltage at the second terminal of the second comparison unit 1032 is higher than the voltage at the third terminal of the second comparison unit 1032, the control signal for the first transistor T1 output by the fourth terminal of the second comparison unit 1032 is at a high voltage level; when the voltage at the second terminal of the second comparison unit 1032 is lower than the voltage at the third terminal of the second comparison unit 1032, the control signal for the first transistor T1 output by the output terminal of the second comparison unit 1032 is at a low voltage level.

The constant current unit 104 is a model which functions as an actual power supply, and its terminal button can always provide a constant current, which is independent of the voltage across the two terminals, to the outside. The constant current unit 104 has two basic properties: first, the current provided by the constant current unit 104 is constant and independent of the voltage cross the two terminals; second, the current of the constant current unit 104 is determined, and the voltage across the two terminals are arbitrary. That is, the constant current unit 104 is controlled by the constant-current-unit control signal to output a constant current, and the constant current can be set according to actual requirements.

The timing unit 105 operates as a register for setting the current limiting time. That is, the timing unit 105 is configured to output the comparison-unit control signal at intervals with a preset time. When the first terminal of the second comparison unit 1032 receives the comparison-unit control signal, the second comparison unit 1032 starts to operate; when the first terminal of the second comparison unit 1032 does not receive the comparison-unit control signal, the second comparison unit 1032 stops operating.

Figure 4:
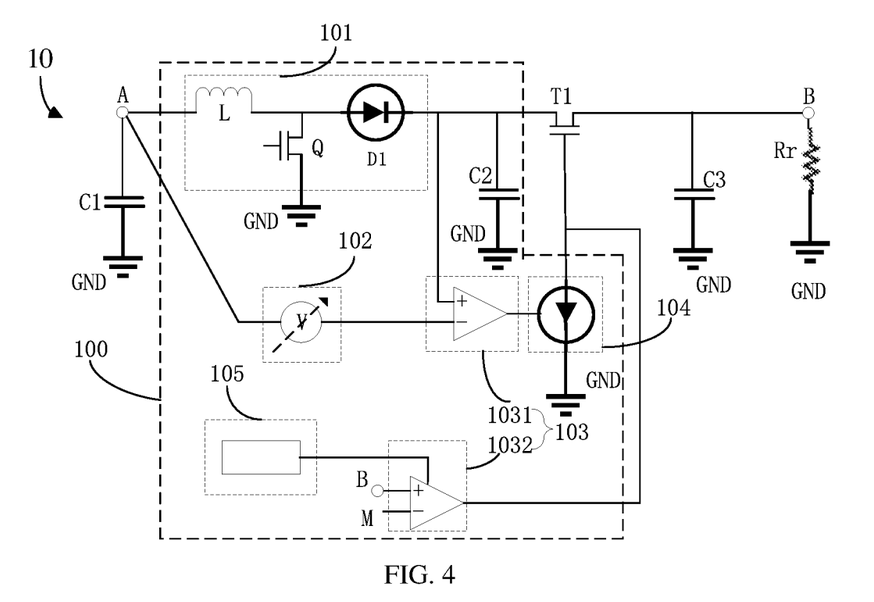
FIG. 4 is a circuit diagram of a current limiting circuit according to an exemplary embodiment of the present disclosure.

Please refer to FIG. 4. FIG. 4 is a circuit diagram of a current limiting circuit according to an exemplary embodiment of the present disclosure. The boost unit 101 comprises an inductor L, a second transistor Q, and a diode DE The first terminal of the inductor L is electrically connected to the first voltage terminal A. The second terminal of the inductor L and the first terminal of the second transistor Q are electrically connected to the first terminal of the diode DE The second terminal of the diode D1 is electrically connected to the input terminal of the first transistor T1. The second terminal of the second transistor Q is electrically connected to the ground terminal GND. The operation process of the boost unit 101 can be divided into two processes: a charging process and a discharging process.

Figure 5:
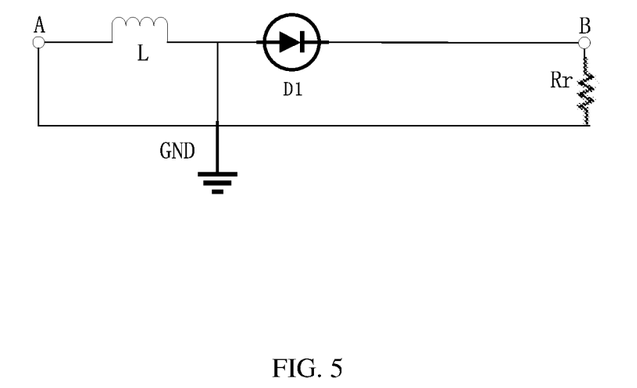
FIG. 5 is a schematic diagram showing a charging process of a boost unit.
Figure 6:
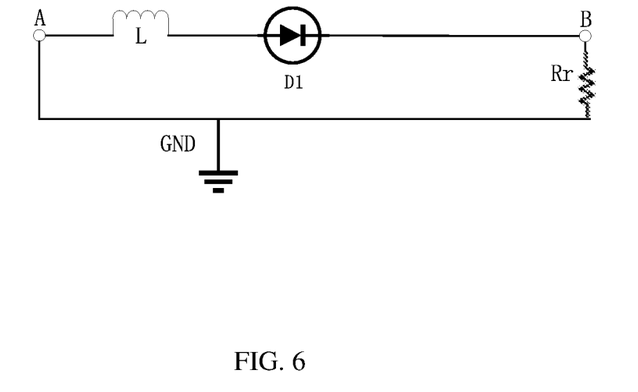
FIG. 6 is a schematic diagram showing a discharging process of a boost unit.

Please to FIG. 5 and FIG. 6. FIG. 5 is a schematic diagram showing a charging process of the boost unit 101, and FIG. 6 is a schematic diagram showing a discharging process of the boost unit 101. During the charging process, the second transistor Q is turned on. At this time, the input voltage passes through the inductor L. The diode D1 prevents the capacitor from discharging to the ground. Since the input is a direct current, the current on the inductor L increases linearly by a certain ratio that is related to the size of the inductor L. As the current of the inductor L increases, some energy is stored in the inductor L. During the discharging process, the second transistor Q is turned off. When the second transistor Q is turned off, due to the current retention characteristic of the inductor L, the current flowing through the inductor L does not immediately decrease to zero, but slowly change to zero from the value when the charging is completed to zero. The original circuit has been disconnected, so the inductor L is discharged only through a new circuit, that is, the inductor L starts to charge the capacitor. The voltage across the two terminals of the capacitor increases. At this time, the voltage is higher than the input voltage, and the boosting is completed.

The variable voltage unit 102 may comprise a variable voltage source. The first terminal of the variable voltage source is electrically connected to the first voltage terminal A. The second terminal of the variable voltage source is electrically connected to the first terminal of the first comparison unit 1031. In some embodiments, the variable voltage unit 102 may be implemented by another device having the same characteristics. That is, the variable voltage unit 102 may be implemented by a device capable of providing variable voltage.

The current limiting value of the current limiting circuit 10 can be obtained according to the following formula: I=(V1−V2)/R, wherein I represents the current limiting value of the current limiting circuit, V1 represents the voltage value set by the variable voltage source, V2 represents a voltage drop value of the diode D1, and R represents the impedance of the inductor L. For example: the current limit value of the current limiting circuit is equal to 1 A when the impedance of the inductor L is 50 milliohms, the voltage drop value of the diode D1 is 350 millivolts, and the voltage of the variable voltage source is set to 400 millivolts; the current limit value of the current limiting circuit is equal to 2 A when the impedance of the inductor L is 50 milliohms, the voltage drop value of the diode D1 is 350 millivolts, and the voltage of the variable voltage source is set to 450 millivolts; the current limit value of the current limiting circuit is equal to 3 A when the impedance of the inductor L is 50 milliohms, the voltage drop value of the diode D1 is 350 millivolts, and the voltage of the variable voltage source is set to 500 millivolts; and the current limit value of the current limiting circuit is equal to 4 A when the impedance of the inductor L is 50 milliohms, the voltage drop value of the diode D1 is 350 millivolts, and the voltage of the variable voltage source is set to 550 millivolts. Based on the above description, the embodiment of the present disclosure can provide multiple different current limit values of the current limit circuit by setting the voltage value of the variable voltage source.

The first comparison unit 1031 comprises a first comparator. The first terminal of the first comparator is electrically connected to the second terminal of the variable voltage unit 102. The second terminal of the first comparator is electrically connected to the input terminal of the first transistor T1. The third terminal of the first comparator is electrically connected to the first terminal of the constant current unit 104.

The first terminal of the first comparator is a "negative (−)" input terminal, the second terminal of the first comparator is a "positive (+)" input terminal, and the third terminal of the first comparator is an output terminal. When the voltage at the first terminal of the first comparator is higher than the voltage at the second terminal of the first comparator, the constant-current-unit control signal output by the third terminal of the first comparator is at a low voltage level. When the voltage at the first terminal of the first comparator is lower than the voltage at the second terminal of the first comparator, the constant-current-unit control signal output by the third terminal of the first comparator is at a high voltage level.

The first comparator compares the sum of the voltage at the first voltage terminal A and the voltage of the variable voltage source with the voltage at the first terminal of the first transistor T1. When the sum of the voltage at the first voltage terminal A ands the voltage of the variable voltage source is greater than the voltage at the first terminal of the first transistor T1, the first comparator outputs a low-level voltage; when the sum of the voltage at the first voltage terminal A and the voltage of the variable voltage source is less than the voltage at the first terminal of the first transistor T1, the first comparator outputs a high-level voltage.

The constant current unit 104 comprises a constant current source. The first terminal of the constant current source is electrically connected to the third terminal of the first comparison unit 1031. The second terminal of the constant current source is electrically connected to the control terminal of the first transistor T1. The third terminal of the constant current source is electrically connected to the ground terminal GND. In some embodiments, the constant current unit 104 may be implemented by another device having the same characteristics. That is, the constant current unit 104 may be implemented by a device that can provide a constant current. When the first terminal of the constant current source is at a high voltage level, the constant current source is activated to operate; when the first terminal of the constant current source is at a low voltage level, the constant current source is inactivated.

The timing unit 105 comprises a timer. The timer is electrically connected to the first terminal of the second comparison unit 1032. The timer outputs a high voltage signal at a preset time interval. For example, the timer can be set to different detection time scales, such as 4 milliseconds, 6 milliseconds, 8 milliseconds, or 10 milliseconds.

The second comparison unit 1032 comprises a second comparator. The first terminal of the second comparator is electrically connected to the timing unit 105. The second terminal of the second comparator is electrically connected to the second voltage terminal B. The third terminal of the second comparator receives the constant voltage signal M. The fourth terminal of the second comparator is electrically connected to the control terminal of the first transistor T1.

The first terminal of the second comparator is an enable terminal, the second terminal of the second comparator is a "positive (+)" input terminal, the third terminal of the second comparator is a "negative (−)" input terminal, and the fourth terminal of the second comparator is an output terminal. When the first terminal of the second comparator is at a high voltage level, the second comparator starts to operate. When the first terminal of the second comparator is at a low voltage level, the second comparator stops operating. When the voltage at the second terminal of the second comparator is higher than the voltage at the third terminal of the second comparator, the control signal for the first transistor T1 output by the fourth terminal of the second comparator is at a high voltage level; when the voltage at the second terminal of the second comparator is less than the voltage at the third terminal of the second comparator, the control signal for the first transistor T1 output by the output terminal of the second comparator is at a low voltage level.

When the first terminal of the second comparator is at the high voltage level, the second comparator is activated to operate; when the first terminal of the second comparator is at the low voltage level, the second comparator is inactivated. The second comparator compares the voltage at the second voltage terminal B with the voltage of the constant voltage signal M. When the voltage at the second voltage terminal B is higher than the voltage of the constant voltage signal M, the first comparator outputs a high-level voltage; when the voltage at the second voltage terminal B is less than the voltage of the constant voltage signal M, the first comparator outputs a low-level voltage.

The voltage value of the constant voltage signal M is in a range between 0.85 times the voltage value of the first voltage terminal A and 0.9 times the voltage value of the first voltage terminal A. In some embodiments, the voltage value of the constant voltage signal M may be set to a value between 0.85 times the voltage value of the first voltage terminal A and 0.9 times the voltage value of the first voltage terminal A. In another embodiment, a multiplier may be connected in series between the first voltage terminal A and the third terminal of the second comparison unit 1032, so that the voltage value of the constant voltage signal M is equal to a value between 0.85 times the voltage value of the first voltage terminal A and 0.9 times the voltage value of the first voltage terminal A.

Take the voltage of the variable voltage source being set to 400 millivolts as an example for description. The current on the path formed by the first voltage terminal A and the second voltage terminal B is input by the first voltage terminal A and reaches the second voltage terminal B through the inductor L, the diode D1, and the first transistor T1. The voltage difference between the first voltage terminal A and the first terminal of the first transistor T1 is detected and compared with the voltage of the variable voltage source (the voltage of the variable voltage source is currently set to 400 millivolts). When the voltage difference between the first voltage terminal A and the first terminal of the first transistor T1 is less than 400 millivolts, the constant current source is activated and continuously pulls down the potential of the control terminal of the first transistor T1 by a current of 20 microamps, so that the first transistor T1 is gradually turned on, which causes charging from the first voltage terminal A to the second voltage terminal B. When the voltage difference between the first voltage terminal A and the first terminal of the first transistor T1 is greater than 400 millivolts, the constant current source is inactivated and does not pull down the potential of the control terminal of the first transistor T1 by the current of 20 microamps, so that the first transistor T1 is in a half-on state thereby achieving the purpose of the current limiting.

Take the timer being set to 4 milliseconds and the constant voltage signal M being set to 0.9 times the voltage value of the first voltage terminal A as an example for description. The timer is a register for setting the current limiting time, and the current limiting time is currently set to 4 milliseconds. The time point when the first transistor T1 is turned on serves as the starting time point for the timing, and after 4 milliseconds has elapsed from the starting time point, the voltage value of the second voltage terminal B is detected. If the voltage value of the second voltage terminal B is greater than 0.9 times the voltage of the first voltage terminal A, the power loop is considered normal, and the first transistor T1 is turned on continuously. The case where the voltage value of the second voltage terminal B is less than 0.9 times the voltage of the first voltage terminal A indicates that a short circuit of a load may occur in the loop. In this case, the first transistor T1 is turned off to protect the back-end electrons devices.

The variable voltage unit 102, the first comparison unit 1031, the constant current unit 104, the timing unit 105, and the second comparison unit 1032 are all disposed in the power management integrated chip. The boost unit 101 and the first transistor T1 are disposed outside the power management integrated chip.

The current limiting circuit further comprises a first capacitor C1, a second capacitor C2, a third capacitor C3, and a resistor Rr. The first terminal of the first capacitor C1 is electrically connected to the first voltage terminal A. The first terminal of the second capacitor C2 is electrically connected to the input terminal of the first transistor T1. The first terminal of the third capacitor C3 and the first terminal of the resistor Rr are electrically connected to the second voltage terminal B. The second terminal of the first capacitor C1, the second terminal of the second capacitor C2, the second terminal of the third capacitor C3, and the second terminal of the resistor Rr are electrically connected to the ground terminal GND.

The current limiting circuit of the embodiment of the present disclosure controls the state of the first transistor through outputting a control signal by the current limiting module to the control terminal of the first transistor so that the current limiting value and the current limiting time of the current limiting circuit are adjustable, thereby preventing the power management integrated chip from causing the failed booted-up under a heavy load and further preventing the power management integrated chip from being damaged due to a short-circuited back-end load during the booting-up.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A current limiting circuit, comprising:
a first voltage terminal;
a second voltage terminal;
a first transistor comprising an input terminal and an output terminal of the first transistor that are connected in series on a path formed by the first voltage terminal and the second voltage terminal;
a current limiting module electrically connected to a control terminal of the first transistor;
a boost unit, wherein a first terminal of the boost unit is electrically connected to the first voltage terminal, and a second terminal of the boost unit is electrically connected to the input terminal of the first transistor;
a variable voltage unit, wherein a first terminal of the variable voltage unit is electrically connected to the first voltage terminal;
a first comparison unit, wherein a first terminal of the first comparison unit is electrically connected to a second terminal of the variable voltage unit, a second terminal of the first comparison unit is electrically connected to the input terminal of the first transistor, and
a constant current unit, wherein a third terminal of the first comparison unit is electrically connected to a first terminal of the constant current unit, and a second terminal of the constant current unit is electrically connected to the control terminal of the first transistor;
wherein the current limiting module is configured to output a control signal to the control terminal of the first transistor for controlling a state of the first transistor so that a current limiting value of the current limiting circuit is adjustable,
wherein the boost unit is configured to cause a voltage at the second terminal of the boost unit to be higher than a voltage at the first terminal of the boost unit, the variable voltage unit is configured to output a variable voltage, the first comparison unit is configured to output a constant-current-unit control signal at the third terminal of the first comparison unit based on a voltage at the first terminal of the first comparison unit and a voltage at the second terminal of the first comparison unit, and the constant current unit is controlled by the constant-current-unit control signal to output a constant current.

2. The current limiting circuit of claim 1, wherein the boost unit comprises an inductor, a second transistor, and a diode, and
wherein, a first terminal of the inductor is electrically connected to the first voltage terminal, a second terminal of the inductor and a first terminal of the second transistor are electrically connected to a first terminal of the diode, a second terminal of the diode is electrically connected to the input terminal of the first transistor, and a second terminal of the second transistor is electrically connected to a ground terminal.

3. The current limiting circuit of claim 2, wherein the current limiting value of the current limiting circuit is obtained according to a formula:

$I=(V1-V2)/R$, and wherein I represents the current limiting value of the current limiting circuit, V1 represents a voltage value set by the variable voltage unit, V2 represents a voltage drop value of the diode, and R represents an impedance value of the inductor.

4. The current limiting circuit of claim 1, wherein the variable voltage unit comprises a variable voltage source,
wherein a first terminal of the variable voltage source is electrically connected to the first voltage terminal, and a second terminal of the variable voltage source is electrically connected to the first terminal of the first comparison unit.

5. The current limiting circuit of claim 1, wherein the first comparison unit comprises a first comparator, and
wherein a first terminal of the first comparator is electrically connected to the second terminal of the variable voltage unit, a second terminal of the first comparator is electrically connected to the input terminal of the first transistor, and a third terminal of the first comparator is electrically connected to the first terminal of the constant current unit.

6. The current limiting circuit of claim 1, wherein the constant current unit comprises a constant current source, and
wherein a first terminal of the constant current source is electrically connected to the third terminal of the first comparison unit, a second terminal of the constant current source is electrically connected to the control terminal of the first transistor, and a third terminal of the constant current source is electrically connected to a ground terminal.

7. The current limiting circuit of claim 1, further comprising a timing unit and a second comparison unit,
wherein the timing unit is electrically connected to a first terminal of the second comparison unit, a second terminal of the second comparison unit is electrically connected to the second voltage terminal, a third terminal of the second comparison unit receives a constant voltage signal, and a fourth terminal of the second comparison unit is electrically connected to the control terminal of the first transistor,
wherein the timing unit is configured to output a comparison-unit control signal at intervals with a preset time,
wherein the second comparison unit is controlled by the comparison-unit control signal to output a first-transistor control signal of the first transistor at the fourth terminal of the second comparison unit to the control terminal of the first transistor based on a voltage at the second terminal of the second comparison unit and a voltage at the third terminal of the second comparison unit.

8. The current limiting circuit of claim 7, wherein the timing unit comprises a timer, wherein the timer is electrically connected to the first terminal of the second comparison unit.

9. The current limiting circuit of claim 7, wherein the second comparison unit comprises a second comparator,
wherein a first terminal of the second comparator is electrically connected to the timing unit, a second terminal of the second comparator is electrically connected to the second voltage terminal, a third terminal of the second comparator receives the constant voltage signal, and a fourth terminal of the second comparator is electrically connected to the control terminal of the first transistor.

10. The current limiting circuit of claim 7, wherein a voltage value of the constant voltage signal is in a range between 0.85 times a voltage value of the first voltage terminal and 0.9 times the voltage value of the first voltage terminal.

11. The current limiting circuit of claim 1, further comprising a first capacitor, a second capacitor, a third capacitor, and a resistor,
wherein a first terminal of the first capacitor is electrically connected to the first voltage terminal, a first terminal of the second capacitor is electrically connected to the input terminal of the first transistor, a first terminal of the third capacitor and a first terminal of the resistor are electrically connected to the second voltage terminal, and a second terminal of the first capacitor, a second terminal of the second capacitor, a second terminal of the third capacitor, and a second terminal of the resistor are electrically connected to a ground terminal.

12. A current limiting circuit, comprising:
a first voltage terminal;
a second voltage terminal;
a first transistor comprising an input terminal and an output terminal of the first transistor that are connected in series on a path formed by the first voltage terminal and the second voltage terminal;
a current limiting module electrically connected to a control terminal of the first transistor;
a boost unit, wherein a first terminal of the boost unit is electrically connected to the first voltage terminal, and a second terminal of the boost unit is electrically connected to the input terminal of the first transistor;
a variable voltage unit, wherein a first terminal of the variable voltage unit is electrically connected to the first voltage terminal;
a first comparison unit, wherein a first terminal of the first comparison unit is electrically connected to a second terminal of the variable voltage unit, a second terminal of the first comparison unit is electrically connected to the input terminal of the first transistor, and
a constant current unit, wherein a third terminal of the first comparison unit is electrically connected to a first terminal of the constant current unit, and a second terminal of the constant current unit is electrically connected to the control terminal of the first transistor;
a first capacitor, electrically connected between a first terminal to the first voltage terminal and a ground terminal;
a second capacitor, electrically connected between the input terminal of the first transistor and the ground terminal;
a third capacitor, electrically connected between the second voltage terminal and the ground terminal; and
a resistor, electrically connected between the second voltage terminal and the ground terminal;
wherein the current limiting module is configured to output a control signal to the control terminal of the first transistor for controlling a state of the first transistor so that a current limiting value of the current limiting circuit is adjustable, and
wherein the boost unit is configured to cause a voltage at the second terminal of the boost unit to be higher than a voltage at the first terminal of the boost unit, the variable voltage unit is configured to output a variable voltage, the first comparison unit is configured to output a constant-current-unit control signal at the third terminal of the first comparison unit based on a voltage at the first terminal of the first comparison unit and a voltage at the second terminal of the first comparison unit, and the constant current unit is controlled by the constant-current-unit control signal to output a constant current.

13. The current limiting circuit of claim 12, wherein the boost unit comprises an inductor, a second transistor, and a diode, and
wherein, a first terminal of the inductor is electrically connected to the first voltage terminal, a second terminal of the inductor and a first terminal of the second transistor are electrically connected to a first terminal of the diode, a second terminal of the diode is electrically connected to the input terminal of the first transistor, and a second terminal of the second transistor is electrically connected to the ground terminal.

14. The current limiting circuit of claim 13, wherein the current limiting value of the current limiting circuit is obtained according to a formula:

$$I=(V1-V2)/R, \text{ and}$$

wherein I represents the current limiting value of the current limiting circuit, V1 represents a voltage value set by the variable voltage unit, V2 represents a voltage drop value of the diode, and R represents an impedance value of the inductor.

15. The current limiting circuit of claim 12, wherein the variable voltage unit comprises a variable voltage source,
wherein a first terminal of the variable voltage source is electrically connected to the first voltage terminal, and a second terminal of the variable voltage source is electrically connected to the first terminal of the first comparison unit.

16. The current limiting circuit of claim 12, wherein the first comparison unit comprises a first comparator, and
wherein a first terminal of the first comparator is electrically connected to the second terminal of the variable voltage unit, a second terminal of the first comparator is electrically connected to the input terminal of the first transistor, and a third terminal of the first comparator is electrically connected to the first terminal of the constant current unit.

17. The current limiting circuit of claim 12, wherein the constant current unit comprises a constant current source, and
wherein a first terminal of the constant current source is electrically connected to the third terminal of the first comparison unit, a second terminal of the constant current source is electrically connected to the control terminal of the first transistor, and a third terminal of the constant current source is electrically connected to the ground terminal.

18. The current limiting circuit of claim 12, further comprising a timing unit and a second comparison unit,
wherein the timing unit is electrically connected to a first terminal of the second comparison unit, a second terminal of the second comparison unit is electrically connected to the second voltage terminal, a third terminal of the second comparison unit receives a constant voltage signal, and a fourth terminal of the second comparison unit is electrically connected to the control terminal of the first transistor, wherein the timing unit is configured to output a comparison-unit control signal at intervals with a preset time, wherein the second comparison unit is controlled by the comparison-unit control signal to output a first-transistor control signal of the first transistor at the fourth terminal of the second comparison unit to the control terminal of the first transistor based on a voltage at the second terminal of the second comparison unit and a voltage at the third terminal of the second comparison unit.

19. The current limiting circuit of claim 18, wherein the timing unit comprises a timer electrically connected to the first terminal of the second comparison unit, and the second comparison unit comprises a second comparator, wherein a first terminal of the second comparator is electrically connected to the timing unit, a second terminal of the second comparator is electrically connected to the second voltage terminal, a third terminal of the second comparator receives the constant voltage signal, and a fourth terminal of the second comparator is electrically connected to the control terminal of the first transistor.

* * * * *